(12) United States Patent
Shedlock et al.

(10) Patent No.: US 8,138,471 B1
(45) Date of Patent: Mar. 20, 2012

(54) X-RAY BACKSCATTER DEVICE FOR WELLBORE CASING AND PIPELINE INSPECTION

(75) Inventors: Daniel Shedlock, Knoxville, TN (US); Andrew Hammerschmidt, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 12/963,654

(22) Filed: Dec. 9, 2010

(51) Int. Cl.
*G01V 5/08* (2006.01)

(52) U.S. Cl. .................................................. 250/269.1

(58) Field of Classification Search .......... 250/253–268, 250/269.1–269.8
See application file for complete search history.

(56) References Cited

U.S. PATENT DOCUMENTS

| | | | |
|---|---|---|---|
| 3,564,251 A * | 2/1971 | Youmans | 250/269.1 |
| 3,775,612 A * | 11/1973 | Foster et al. | 378/60 |
| 4,006,359 A * | 2/1977 | Sullins et al. | 378/60 |
| 6,735,279 B1 | 5/2004 | Jacobs et al. | |
| 7,130,374 B1 | 10/2006 | Jacobs et al. | |
| 7,224,772 B2 | 5/2007 | Jacobs et al. | |
| 7,623,626 B2 | 11/2009 | Safai et al. | |
| 7,643,611 B2 | 1/2010 | Shedlock et al. | |
| 2007/0206726 A1* | 9/2007 | Lu et al. | 378/146 |
| 2008/0127438 A1* | 6/2008 | Harr | 15/104.13 |
| 2009/0147907 A1* | 6/2009 | Wraight | 378/1 |

OTHER PUBLICATIONS

Callerame, Joseph, "X-Ray Backscatter Imaging: Photography Through Barriers", JCPDS-International Centre for Diffraction Data 2006 ISSN 1097-0002, pp. 13-20.

* cited by examiner

*Primary Examiner* — Kiho Kim
(74) *Attorney, Agent, or Firm* — Mark E. Fejer

(57) ABSTRACT

An apparatus for inspection in situ of a wellbore casing and a pipeline from inside the wellbore or pipeline. The apparatus includes a penetrating radiation source such as x-rays, a rotatable beam collimator adapted to collimate the penetrating radiation source and produce at least one pencil radiation beam rotatable about the radiation source, an arcuate radiation detector suitable for detecting radiation scattered off a target, and a housing containing the radiation source, the rotatable beam collimator, and the radiation detector. The housing is provided with at least one exit point for exiting of the at least one pencil radiation beam from the housing.

22 Claims, 5 Drawing Sheets

X-RAY BACKSCATTER DEVICE FOR WELLBORE CASING AND PIPELINE INSPECTION

BACKGROUND OF THE INVENTION

1. Field of the Invention

This invention relates to radiation backscatter imaging devices. In one aspect, this invention relates to x-ray backscatter imaging devices. In one aspect, this invention relates to in situ inspection of wellbore casings and pipelines. In one aspect, this invention relates to the use of radiation backscatter imaging devices for in situ inspection of wellbore casings and pipelines.

2. Description of Related Art

Scaling, corrosion, precipitates, and pipe and casing defects are all issues storage and pipeline operators face on a continual basis in managing the integrity of their production well and pipeline assets. These defects often lead to diminished deliverability, on the order of 5 to 20%, in production wells, casing integrity issues requiring costly remediation, pipeline integrity issues requiring repair or replacement, and potentially catastrophic failures which may result in serious injury or even fatalities. Conventional mineral scale formation, microbial induced corrosion, and material defect assessment and inspection processes in wellbores and pipelines are complicated, time-consuming, and very costly due to the range of operating conditions and existing inspection technologies. Thus, there is a need for wellbore and pipeline inspection devices which are less complicated, less time-consuming, and less expensive than conventional devices and which are able to operate in the extreme conditions inside wellbores and pipelines.

X-ray imaging techniques based on Compton backscatter enable inspection and screening of a wide variety of objects including vehicles, luggage, and even people. In contrast to more commonly used transmission images, backscatter imaging involves positioning both the radiation source and the detection apparatus on the same side of a target object.

Compton x-ray backscatter images are formed by scanning a pencil-shaped illumination beam of x-rays along one dimension of an object that is being inspected. At each position of the scanning pencil illumination beam, scattered x-rays are collected by large detectors placed on the same side of the system as the x-ray source. By tracking the instantaneous position of the pencil illumination beam on the target object and measuring the overall intensity of the scattered x-rays incident on the detectors, a scattered intensity can be associated with each beam position on the target object. The entire two-dimensional image can then be constructed by moving either the target object or the conveyance containing the x-ray source-detector combination in a direction perpendicular to the direction of the pencil beam scan. In this way, the target object can be scanned line by line.

To produce a continuous stream of data with substantially all of the parts of the target image showing, the x-ray source must produce either a continuous or high duty cycle fan beam output. To cover a reasonable field of view, the fan beam opening angle should also be large. To enable a pixel-by-pixel beam scan on the target, a moving collimator positioned in front of the fan beam with an opening designed to allow the desired size pencil beam through his required. As the collimator moves, different parts of the x-ray fan beam are selected by the collimator, with the effect of scanning the pencil beam in one dimension across the target. Conventionally, a rotating collimator rather than a reciprocating motion is used to provide this function. The resolution of the system is determined from a combination of the chopper wheel aperture, x-ray tube focal spot size, the size of the chopper wheel, and the distance to the object being scanned. The backscatter detectors, which are designed to collect the needed backscatter flux, play no role in the image resolution.

SUMMARY OF THE INVENTION

It is one object of this invention to provide an apparatus for in situ wellbore casing and pipeline inspection which is less complicated, less time-consuming, and less expensive than conventional devices.

It is one object of this invention to provide an apparatus for in situ wellbore casing and pipeline inspection which is able to operate in the extreme conditions, e.g. high pressures and temperatures, inside wellbores and pipelines.

These and other objects of this invention are addressed by an apparatus for inspection in situ of a wellbore casing and a pipeline from inside the wellbore or pipeline comprising a penetrating radiation source, a rotatable beam collimator adapted to collimate the penetrating radiation source and produce at least one pencil radiation beam rotatable about the radiation source, an arcuate radiation detector suitable for detecting radiation scattered off a target and offset laterally from the at least one pencil radiation beam, and a housing containing the radiation source, the rotatable beam collimator, and the radiation detector and forming at least one exit point for exiting of the at least one pencil radiation beam from the housing. In accordance with one preferred embodiment, the penetrating radiation source is an x-ray source. In one embodiment, the radiation detector is cylindrical in shape and rotatable together with the rotatable beam collimator. In one embodiment, the rotatable beam collimator produces a plurality of pencil radiation beams and the cylindrical radiation beam detector is divided into a plurality of segments, one segment for each pencil radiation beam.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

As previously indicated, Compton backscatter imaging is a single-sided imaging technique in which the radiation source and the detection/imaging device are located on the same side of the target object. As a result, it is a valuable non-destructive inspection tool because of its single-sided nature, penetrating abilities of radiation, and unique interaction properties of radiation with matter. Changes in the backscatter photon field intensity (resulting in contrast changes in images) are caused by differences in the absorption and scattering cross-sections along the path of the scattered photons. Since the inception of Compton backscatter imaging, a diverse set of imaging techniques have evolved using both collimated and un-collimated detectors, coded apertures, and hard x-ray optics. Pencil beam backscatter imaging uses a highly collimated pencil beam of radiation to interrogate targets. The pencil beams may vary in diameter size from microns to centimeters, but usually consist of a near-parallel array of photons forming a tight beam.

The invention described herein is an apparatus for in situ inspection from inside of wellbore casings and pipelines. However, the apparatus may also be used in other applications having geometric considerations similar to those of wellbore casings and pipelines. For example, the apparatus may be used inside water lines and gas lines, inside commercial chimneys and stacks at power plants, as well as inside large storage vessels to inspect the wall or lining. The apparatus may also provide benefits for inspection of components of dams, bridges, and buildings.

X-ray backscatter imaging devices generally include an x-ray source and a suitable detector disposed on the same side of the object undergoing inspection or screening and may also include a collimator for producing a desired illumination beam. As previously indicated, x-ray backscatter imaging is currently used for inspection and screening of a wide variety of objects such as luggage, vehicles, and people. It will be appreciated that the environment in which conventional x-ray backscatter imaging devices are employed for inspection and screening of these objects is relatively clean and at atmospheric pressure and temperature. In contrast thereto, the environment inside wellbores is not very clean and is typically at elevated temperatures (above room temperature) and elevated pressures (greater than atmospheric), and conventional x-ray backscatter imaging devices are unable to withstand such conditions. In addition, the geometry of wellbore casings and pipelines, i.e. substantially cylindrical, presents challenges for x-ray backscatter imaging which are not present in conventional applications. The apparatus of this invention is intended to address issues relating to use in harsh environments and challenging geometries.

Figure 1:
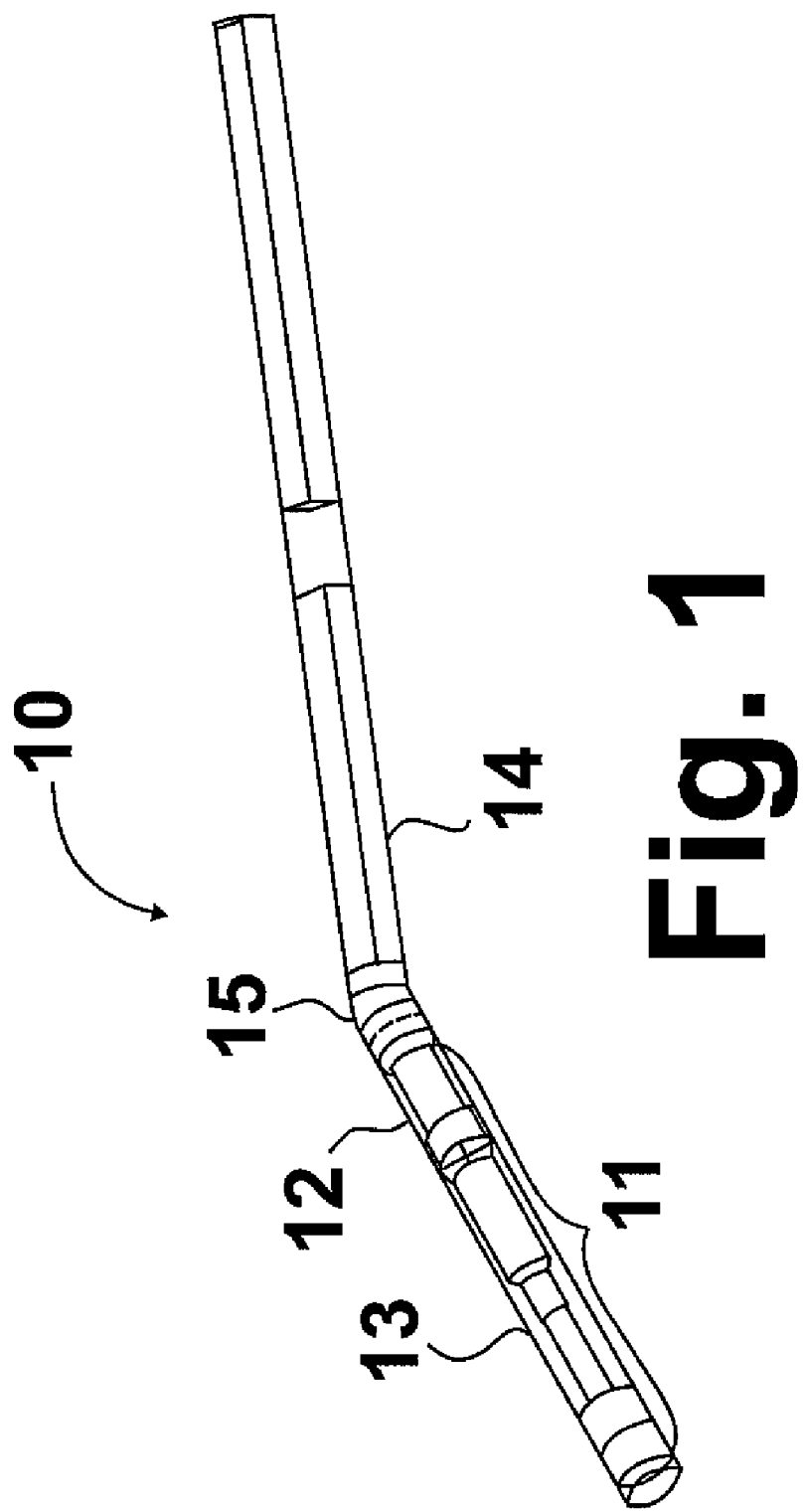
FIG. 1 is a perspective view of a radiation backscatter tool in accordance with one embodiment of this invention.

FIG. 1 is a schematic diagram of an apparatus for inspection of wellbore casings and pipelines in accordance with one embodiment of this invention. The apparatus 10 comprises a radiation backscatter scanning head 11, shown in more detail in FIG. 2, disposed in a generally cylindrical housing 12. In accordance with one preferred embodiment, the ancillary equipment required for powering, controlling and cooling the apparatus is also disposed in the generally cylindrical housing. In accordance with one embodiment, the housing comprises two cylindrical shaped tubes 13, 14 connected end-to-end by a flexible connection 15, thereby enabling the apparatus to go around corners as may be required during the inspection of pipelines. In accordance with one embodiment of this invention, the high voltage (HV) is disposed in the same cylindrical tube as the scanning head. However, it will be appreciated that space, cooling, and EMI requirements may not permit such an arrangement. Accordingly, in accordance with one embodiment, the scanning head 11 is disposed in one cylindrical tube 13 and the ancillary equipment, including the HV required for powering, controlling and cooling the apparatus are disposed in the other cylindrical tube 14.

Figure 2:
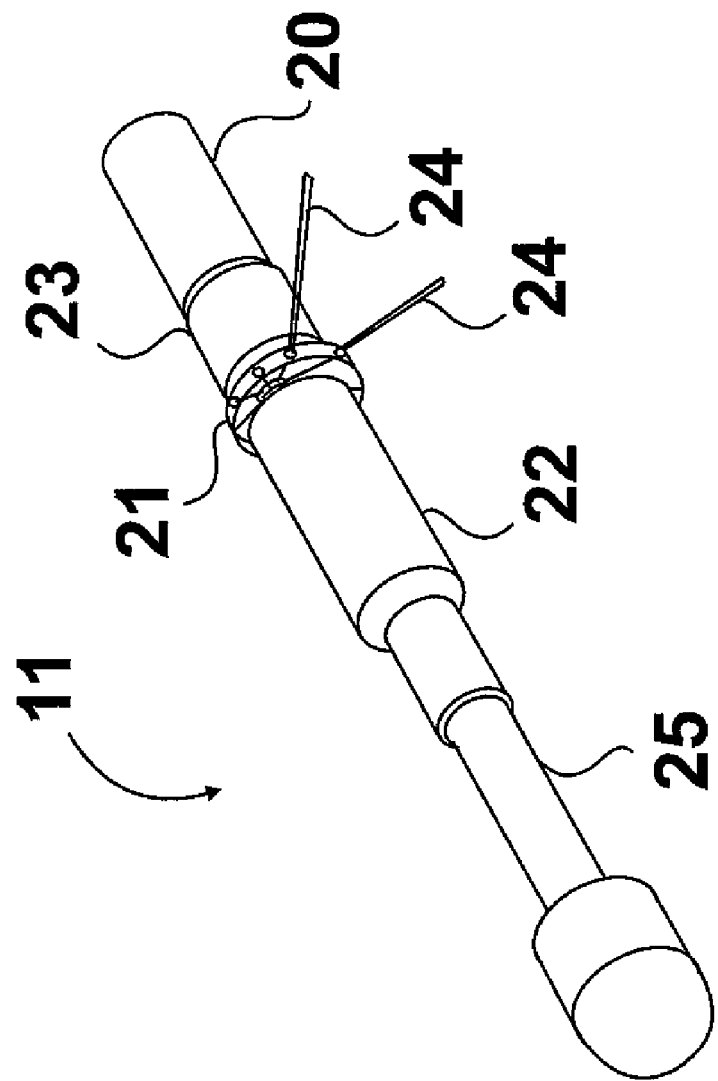
FIG. 2 is a perspective view of a scanning head for a radiation backscatter tool in accordance with one embodiment of this invention.

As shown in FIG. 2, radiation backscatter scanning head 11 comprises a radiation source tube 20, a rotatable collimator 21 driven by a direct drive motor 23 operably connected with the rotatable collimator, and at least one arcuate or cylindrical rotatable detector 22. The radiation source may be any form providing sufficient penetration for the imaging application. In accordance with one embodiment of this invention, the radiation source is selected from the group consisting of x-ray, gamma ray, neutron, terahertz, and electron beam sources. In accordance with one particularly preferred embodiment, the radiation source is an x-ray source. In accordance with one embodiment of this invention, the radiation source is a panoramic radiation source providing 360° of radiation. Rotatable collimator 21 rotates around the radiation source, producing at least one pencil beam of radiation 24 which rotates around the radiation source, allowing the pencil beam to sweep azimuthally along the interior surface of a wellbore casing or interior surface of a pipeline as the radiation scanning head travels within the wellbore casing or through the pipeline. As shown in FIG. 2, the radiation detector is laterally offset from the radiation source and pencil beams 24 to allow the radiation to exit the system, scatter off the object of interest and return to the detector.

Any radiation detector that can convert ionizing radiation into a measurable signal may be employed in the apparatus of this invention. The radiation detection material for use in the radiation detector is preferably selected from the group consisting of polyvinyltoluene (PVT), cerium-doped lutetium yttrium orthosilicate (LYSO), yttrium orthosilicate (YSO), thallium-doped sodium iodide (NaI(Tl)) and cesium iodide (CsI). In addition to the radiation detection material, the radiation detector further comprises electronics 25 which convert the transducer signal from the radiation detector and builds the image of the target object. Such electronics are known in the art. The analog signal is immediately converted by the electronics to a digital signal that may be either stored locally or transmitted in real time back to a control area typically located above ground.

It will be appreciated that the materials used to make the housing must be able to withstand the harsh conditions, such as elevated temperatures and pressures, encountered in downhole environments and inside pipelines. In addition, the materials must also allow the imaging radiation to escape from the radiation source as well as return to the detector. In general, any low density, high strength material that allows for the radiation to exit the housing, scatter, and return to the detector in the housing may by utilized. For x-rays, suitable materials are low z materials. As used herein, the term "low z materials" refers to materials comprising elements having atomic numbers 17 or lower, i.e. $z \leq 17$. Beryllium, which is often used as windows for x-ray tubes because it is relatively transparent to x-rays, may be used. However, beryllium is extremely expensive. Carbon fiber composites are a less expensive alternative and allow x-rays to exit the housing and return to the detector. Aluminum, while not as good as either beryllium or carbon fiber composites, may be used if the particular conditions downhole and/or in the pipelines permit. Polymers are yet another alternative.

In accordance with one embodiment of this invention, the apparatus of this invention is tethered and power for motion, imaging, and radiation source generation are provided through the tether. In addition, data, control, and real time feedback may also be provided through the tether by fiber optic or other information transmitting equipment used for long distance communication.

As previously indicated, the preferred embodiment of the apparatus of this invention employs x-ray backscatter as the imaging method. In accordance with this embodiment, an x-ray high voltage tube is used to generate x-rays. In accordance with one preferred embodiment of this invention, the high-voltage generator generates high-voltage in the range of about 80 to 160 kV. However, higher energy systems may also be used to generate high-voltage x-rays of 225 kV and higher. The high-voltage x-ray generator power required to generate the desired x-rays is about 800 W in order to obtain imaging speeds upwards of 3 to 6 ft./min. Higher power systems or multiple imaging stages also may be used to increase the imaging speed of the system.

It will be appreciated by those skilled in the art that cooling of the x-ray tube is required if an x-ray source is used. Cooling may be delivered as a refrigerant, mechanical cooling such as with a Stirling engine, or electromechanical cooling such as a Peltier cooler. The cooling system should provide adequate heat removal to dissipate the excess heat generated in the x-ray tube. The amount of cooling required is approximately equal to the amount of power consumed by the high-voltage x-ray generator, because better than 99% of the power used to generate the x-rays is dumped into the system as heat. In accordance with one embodiment of this invention, fixed duration cooling may be achieved through the use of a heat dump reservoir containing a low temperature refrigerant such as liquid nitrogen.

In the operation of the apparatus of this invention, a pencil beam of radiation, preferably x-rays, is generated by restricting the illumination field with a rotating collimator. The pencil beam of radiation exits the housing and penetrates the surrounding well casing or pipe. The radiation then backscatters toward the scanning head of the apparatus wherein the signal is detected by a radiation detector. Each pixel of the image is directly related to the backscatter signal from the pencil beam of emitted radiation. In order to generate an image, the pencil beam is rotated using a rotating collimator which moves the pencil beam circumferentially around the wellbore casing or pipe. In accordance with one embodiment of this invention, the illumination beam tube collimator is rotated by an operably connected direct drive motor. In accordance with another embodiment of this invention, the illumination beam is electronically rastered. When the circumferential rotation is combined with a linear translation, the pencil beam can sweep over the entire internal area of the wellbore casing or pipe, covering the entire area with a helix pattern. Each area of the pipe is mapped to a pixel value in the image based upon the location of the pencil beam when the measurement is taken, essentially generating an x-ray backscatter radiograph of the entire inside of the wellbore casing or pipe. For downhole applications, the apparatus of this invention is lowered into the wellbore casing and then drawn out of the casing at a constant velocity using a tether.

The collimator of the apparatus of this invention restricts the illumination beam of radiation to a pencil beam, thereby enabling the inside of the wellbore casing or pipe to be imaged with backscatter one pixel at a time. In accordance with one embodiment of this invention, the illumination beam tube provides at least one single exit point where the beam exits the apparatus, scatters off the surrounding casing or pipe, and is detected by the radiation detector. It is possible to use more than one illumination beam tube and image multiple sections of the casing or pipe simultaneously provided cross-talk between the simultaneous beams can be eliminated.

As previously indicated, the radiation detector of the apparatus of this invention converts the penetrating radiation into a measured electrical signal. In accordance with one embodiment of this invention, the radiation detector employs a scintillator such as sodium iodide or polyvinyl toluene. For a single illumination beam tube collimator, the detector may be a single crystal sodium iodide detector. The x-ray backscatter signal is detected and recorded as a pixel value dependent on the position of the rotating collimator wheel. In accordance with one embodiment of this invention, the collimator provides a plurality of exiting illumination beams, requiring a method to measure the backscatter from each of the illumination beam tubes independently and simultaneously without significant cross-talk. This may be accomplished using a segmented cylindrical detector as shown in FIG. 3a and FIG. 3b.

Figure 3:
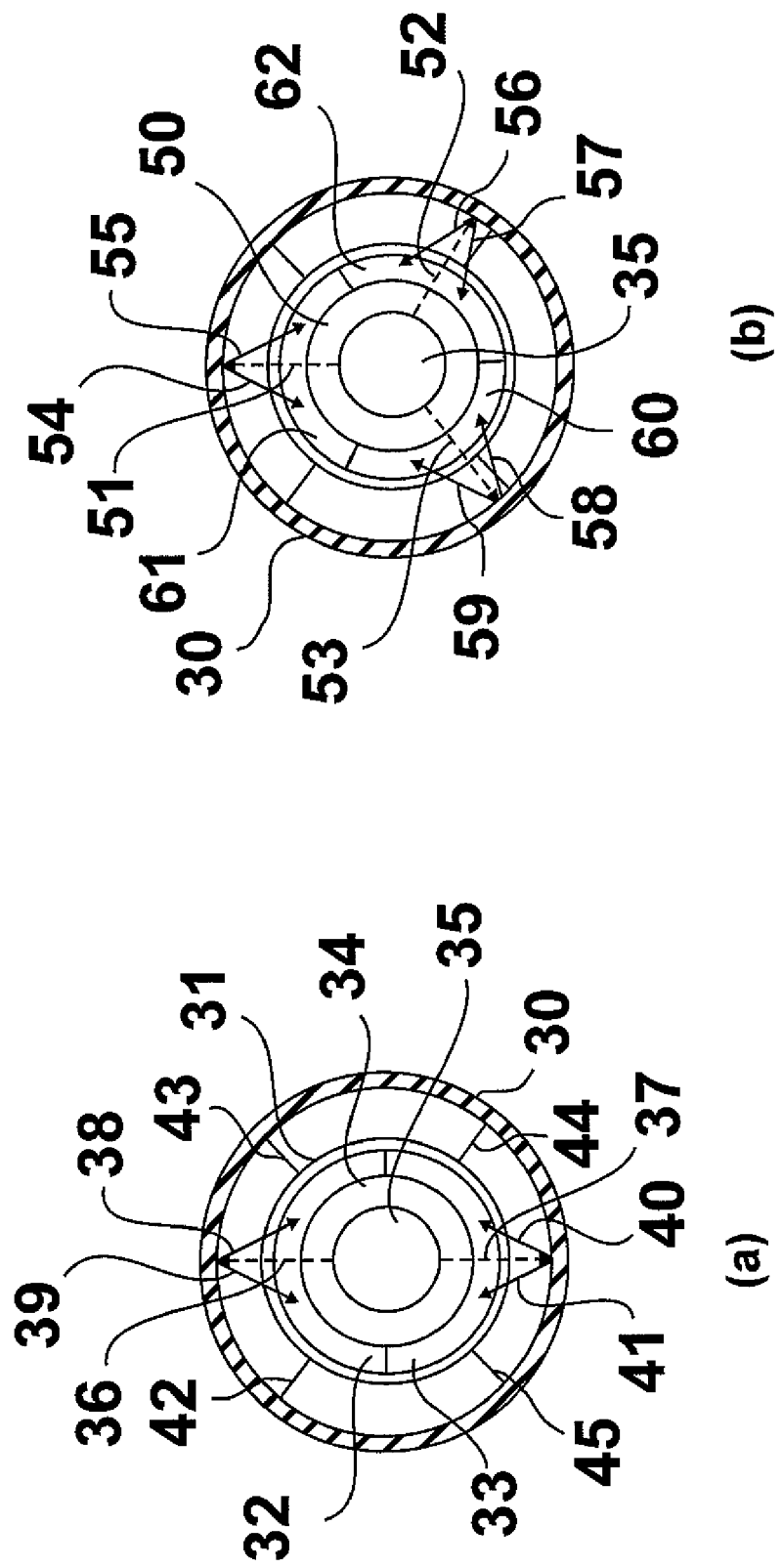
FIG. 3 is a diagrammatic representation of the scanning head for a radiation backscatter tool having a cylindrical radiation detector and employing a plurality of illumination beams in accordance with one embodiment of this invention disposed within a pipe.

FIG. 3a shows a representation of an apparatus in accordance with one embodiment of this invention disposed within a pipe 30, the apparatus comprising housing 31, a bisected cylindrical detector comprising two detector segments 32, 33 which rotates with the illumination beam tube collimator 34 around radiation source 35. Illumination beam tube collimator comprises two illumination beam tubes (not shown) and produces two pencil beams, indicated by arrows 36, 37, which scatter upon impacting with the pipe, indicated by arrows 38, 39, 40, 41, and are detected by detector segments 32, 33, thereby resulting in each half of the detector imaging at the same beam tube. In this case, a double helix image of the wellbore casing or pipe is traced out as the apparatus traverses the wellbore casing or pipe sections. To maintain the apparatus in the center of the pipe, the apparatus is provided with centering means, such as fins 42, 43, 44, 45 which are of substantially equal length and which extend out to contact the pipe 30.

In accordance with one embodiment of this invention as shown in FIG. 3b, the apparatus comprises illumination beam tube collimator 50 having three illumination beam tubes (not shown) which produce three pencil beams, indicated by arrows 51, 52, 53, which scatter upon impacting with the pipe, indicated by arrows 54, 55, 56, 57, 58, 59 and which are detected by detector segments 60, 61, 62. It is to be understood that N number of beam tubes where the detector is segmented into N segments may be employed as long as the detector segments do not become so small that cross-talk between illumination beam tubes becomes an issue. For example, for a small 5 inch diameter pipe, the apparatus will probably employ 2-3 beam tubes and a correspondingly segmented detector. Because the distance between illumination beams increases as the circumference of the wellbore casing or pipe increases, a greater number of beam tubes and detector segments may be employed with larger wellbore casing or pipe circumferences.

Figure 4:
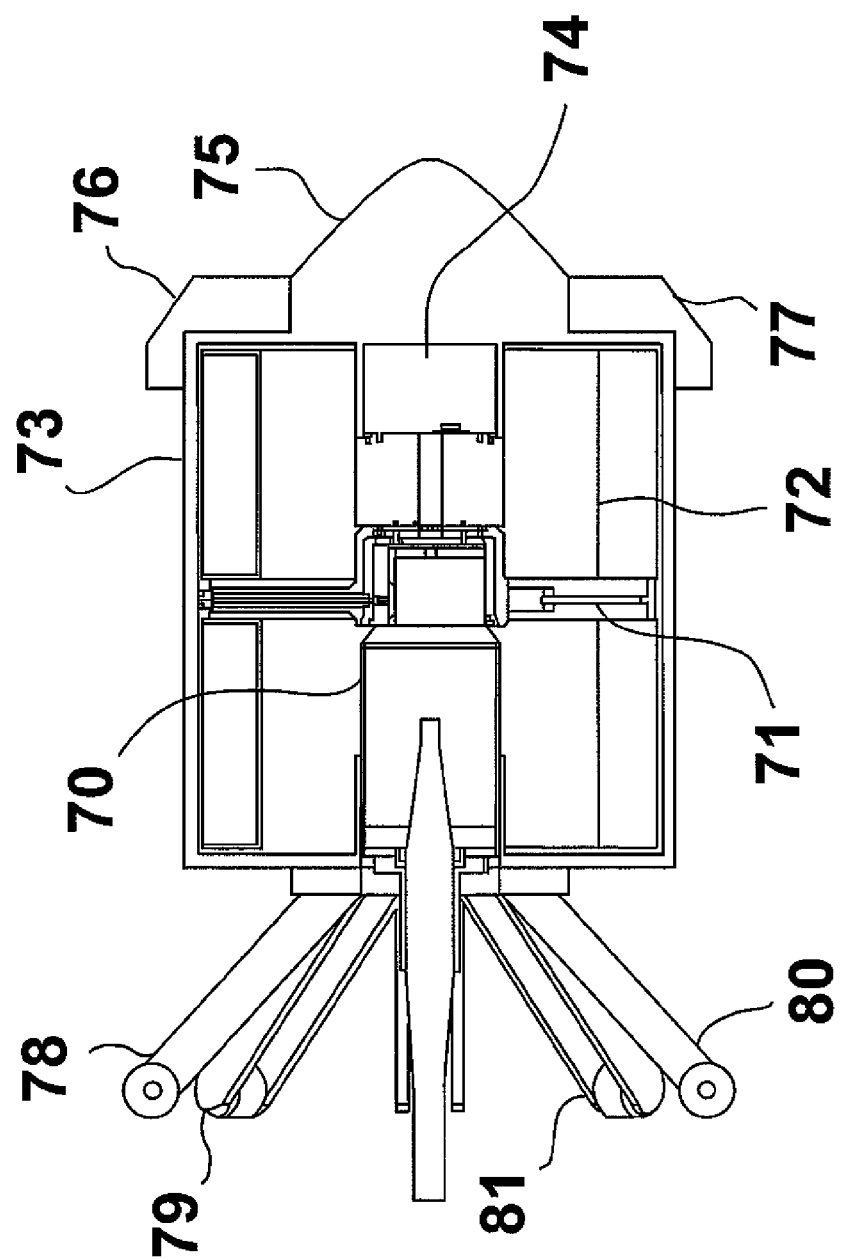
FIG. 4 is a lateral view of a radiation backscatter tool for use in transmission pipelines in accordance with one embodiment of this invention.

FIG. 4 is a diagram of an apparatus in accordance with one embodiment of this invention particularly suitable for use in a pipeline in which the radiation source 70, rotatable collimator 71, and radiation detector 72 are housed within a pig 73. As used herein, the term "pig" refers to a device used to perform a variety of operations relating to the inspection, maintenance, repair or replacement of pipelines from within a pipeline. A pig may be unpowered in which case the pig may be pulled or pushed by means of a tether connected with the pig through the pipeline. Alternatively, a pig may be powered, enabling self-motivation through the pipeline. Either a powered or an unpowered pig may be employed for housing the radiation source, rotatable collimator, and radiation detector of the apparatus of this invention. As shown, the rotatable collimator 71 is operably connected with a direct drive motor 74, also disposed within the pig. To provide centering of the apparatus within the pipeline, the pig comprises a front centering element 75 comprising outwardly extending centering fins 76, 77 and a rear, spring-loaded, centering device comprising a plurality of elements 78, 79, 80, 81 which contact the pipe as the pig moves through the pipe. In accordance with one embodiment of this invention, at least one of the elements of the rear, spring-loaded, centering device includes an encoder for tracking the position of the pig within the pipe.

Figure 5:
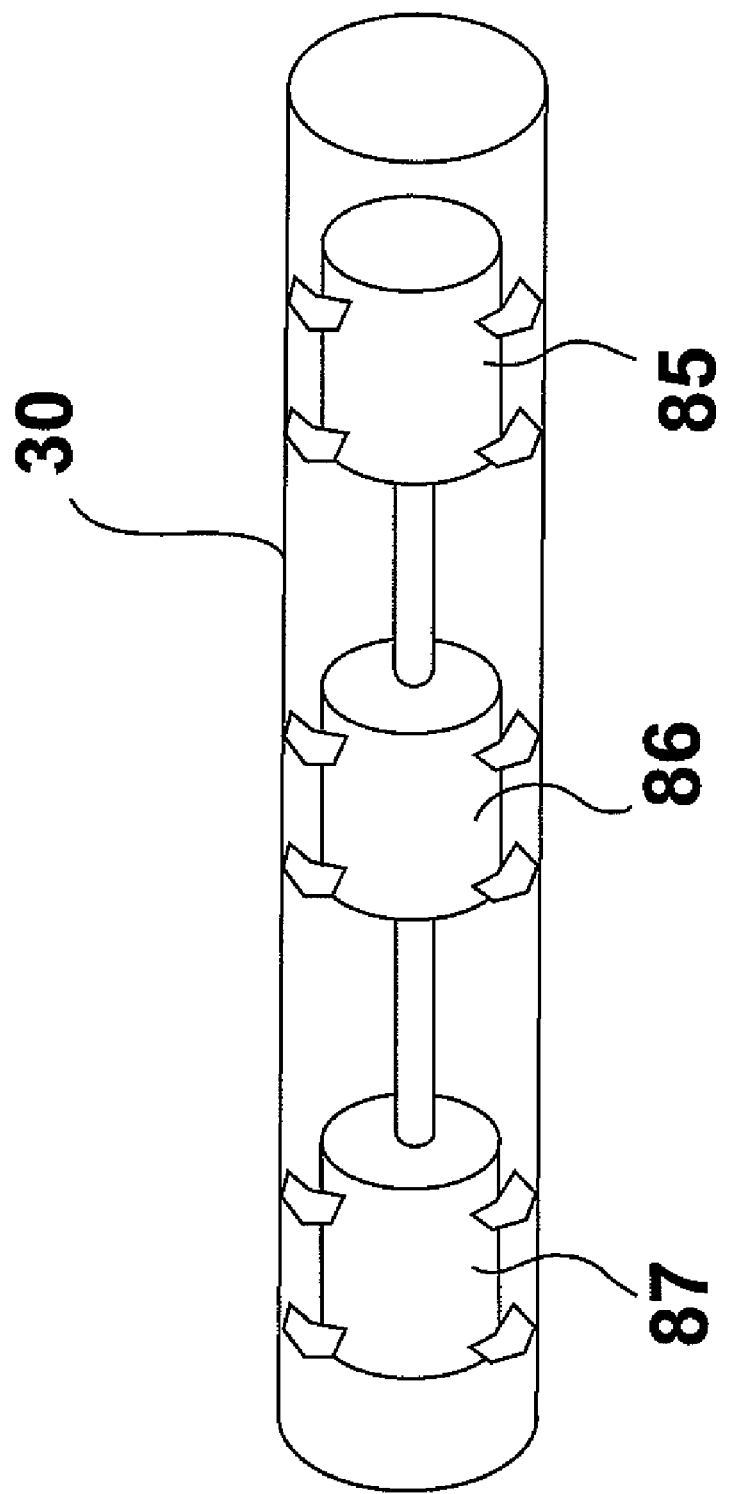
FIG. 5 is a schematic diagram of a multiple pig transmission pipeline scanning system with centering standoffs in accordance with one embodiment of this invention.

In accordance with one embodiment of this invention, all of the components of the apparatus including the x-ray tube, high-voltage generator, control system, battery power, collimator, and detectors are disposed within a single pig. In accordance with another embodiment of this invention, the components of the apparatus are contained within a plurality of pigs. For example, in accordance with one embodiment, the x-ray tube, rotatable collimator, and radiation detector may be disposed within one pig and the high-voltage generator, control system, and battery may be located in a second pig tethered to the first pig. This multiple pig design also allows for multiple scanning head to be controlled by a single controller. An example of a multiple scanning head embodiment of the apparatus of this invention comprising multiple pigs 85, 86, 87 tethered together and disposed within a pipe 30 is shown in FIG. 5. In accordance with one embodiment of this invention, the apparatus is battery-powered with one of the pigs containing a turbine/generator to power the batteries. Due to the fluid flowing through the pipe, the pressure head generated behind the pig may be used to push the pig through the pipe and also may be used for power generation to charge the batteries.

Because the temperatures within a pipeline are relatively low compared with the temperatures in a wellbore, the apparatus may be cooled by water cooling. In accordance with one embodiment, a closed loop water radiator cooling system is used to cool the x-ray tube and high-voltage electronics. This cooling system transfers its heat to the fluid in the pipe. For gaseous fluid, a water-to-air radiator may be employed; for a liquid fluid, a water-water radiator may be used.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for inspection in situ of a wellbore casing inside wall and a pipeline inside wall comprising:
    a radiation source having radiation penetration suitable for imaging a target selected from the group consisting of wellbore casings and pipelines;
    a rotatable beam collimator adapted to collimate said radiation source and produce a plurality of pencil radiation beams rotatable about said radiation source so as to enable said plurality of pencil radiation beams to sweep azimuthally along an interior surface of a hollow cylinder;
    a cylindrical radiation detector, segmented into a plurality of segments corresponding to said plurality of pencil radiation beams and rotatable together with said rotatable beam collimator, suitable for detecting radiation scattered off said target and offset laterally from said plurality of pencil radiation beams; and
    a housing containing said radiation source, said rotatable beam collimator, and said radiation detector and forming a plurality of exit points for exiting of said plurality of pencil radiation beams from said housing.

2. The apparatus of claim 1, wherein said radiation source is a 360° panoramic radiation source.

3. The apparatus of claim 1 further comprising a high voltage generator, a power management and control module, and a cooling system disposed within said housing.

4. The apparatus of claim 3, wherein said housing is segmented, having a forward segment containing said radiation source, said rotatable beam collimator, and said radiation detector and having a rearward segment containing said high-voltage generator, said power management and control module, and said cooling system.

5. The apparatus of claim 1, wherein said radiation source is a source selected from the group consisting of x-ray, gamma ray, neutron, electron beam, and terahertz sources.

6. The apparatus of claim 5, wherein said radiation source is an x-ray.

7. The apparatus of claim 1, wherein said housing is made of a material that enables radiation exit, radiation scatter, and radiation return and detection.

8. The apparatus of claim 7, wherein said material is selected from the group of materials consisting of carbon fiber composite, aluminum, beryllium, low z materials, and combinations thereof.

9. The apparatus of claim 1, wherein said housing has a cylindrical shape.

10. The apparatus of claim 1 further comprising a direct drive motor operably connected with said rotatable beam collimator for rotating said rotatable beam collimator.

11. The apparatus of claim 1, wherein said housing is connected with a tether, said tether providing power for motion, imaging, and source generation.

12. The apparatus of claim 11, wherein said tether is adapted to provide data, control, and real-time feedback.

13. The apparatus of claim 1, wherein said housing is self-powered.

14. A radiation backscatter apparatus comprising:
    a cylindrical housing;
    a scanning head disposed within said cylindrical housing, said scanning head comprising a radiation source, a rotatable beam collimator adapted to collimate said radiation source and produce a plurality of pencil radiation beams rotatable about said radiation source, and a plurality of arcuate radiation detectors corresponding to said plurality of pencil radiation beams suitable for detecting radiation scattered off a target, said plurality of arcuate radiation detectors offset laterally from said plurality of pencil radiation beams; and
    a high-voltage generator, a power management and control module, and a cooling system disposed within said cylindrical housing and operably connected with said scanning head.

15. The apparatus of claim 14, wherein said radiation source is a 360° panoramic radiation source.

16. The apparatus of claim 14, wherein said cylindrical housing is longitudinally segmented, having a forward segment containing said scanning head and having a rearward segment containing said high-voltage generator, said power management and control module, and said cooling system.

17. The apparatus of claim 14, wherein said radiation source is selected from the group consisting of x-ray, gamma ray, neutron, electron beam, and terahertz sources.

18. The apparatus of claim 17, wherein said radiation source is an x-ray.

19. The apparatus of claim 14, wherein said housing is made of a material that allows radiation to exit, radiation scatter, and radiation return.

20. The apparatus of claim 19, wherein said material is a carbon fiber composite.

21. The apparatus of claim 14 further comprising a direct drive motor operably connected with said rotatable beam collimator for rotating said rotatable beam collimator.

22. An apparatus for inspection in situ of a wellbore casing inside wall and a pipeline inside wall comprising:
   a penetrating radiation source;
   a rotatable beam collimator adapted to collimate said penetrating radiation source and produce a plurality of pencil radiation beams rotatable about said penetrating radiation source;
   a plurality of arcuate radiation detectors suitable for detecting radiation scattered off said target and offset laterally from said plurality of pencil radiation beams; and
   a housing containing said penetrating radiation source, said rotatable beam collimator, and said radiation detectors and forming a plurality of exit points for exiting of said plurality of pencil radiation beams from said housing.

* * * * *